United States Patent [19]

Thom

[11] 4,238,444
[45] Dec. 9, 1980

[54] REENFORCED FISHING LURE

[76] Inventor: Joseph R. Thom, 1217 Johnson Ave., Point Pleasant, N.J. 08742

[21] Appl. No.: 71,739

[22] Filed: Aug. 31, 1979

[51] Int. Cl.² .............................................. B29C 1/02
[52] U.S. Cl. ................................... 264/226; 264/220; 264/225; 264/259
[58] Field of Search ............... 264/220, 225, 226, 261, 264/250, 259, 274, 275; 43/42.53

[56] References Cited

U.S. PATENT DOCUMENTS

| 2,741,058 | 12/1952 | Allman | 43/42.53 |
|---|---|---|---|
| 3,186,123 | 6/1965 | Freeman | 43/42.53 |
| 4,108,955 | 8/1978 | Thom | 264/222 |

Primary Examiner—Donald J. Arnold
Assistant Examiner—W. Thompson
Attorney, Agent, or Firm—Charles F. Gunderson

[57] ABSTRACT

An improved fishing lure is made by forming a first sample lure, without hooks and accessories, in the exact image of a desired bait fish. This first sample lure, however, will have a tail section or portion so thin that it would be vulnerable to damage when being handled out of the water as well as in the water when being taken by a larger fish. The dorsal and other fins would be, similarly, fragile—if they were to project in their normal swimming manner—when the exact image of the bait is formed. The tail portion of the sample lure is cut off far enough up on the body of the fish to find a substantially thick crossection, and any dorsal or other fins that would be too delicate to survive may be cut off too. A new tail portion is formed having the same profile as that of the original sample lure, and is attached to the body of a modified sample lure. Dorsal and any other desired fins may also be formed having the same profile as that of the original sample fish in its natural swimming condition and may be attached to the modified sample lure. A new mold is then made of the modified sample lure, and hooks, connecting eyes, and other appurtinances may be placed within the mold to provide an improved and substantially stronger lure.

2 Claims, 7 Drawing Figures

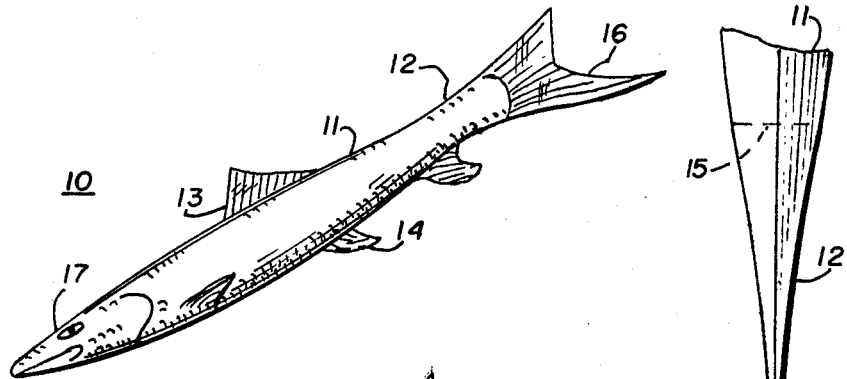
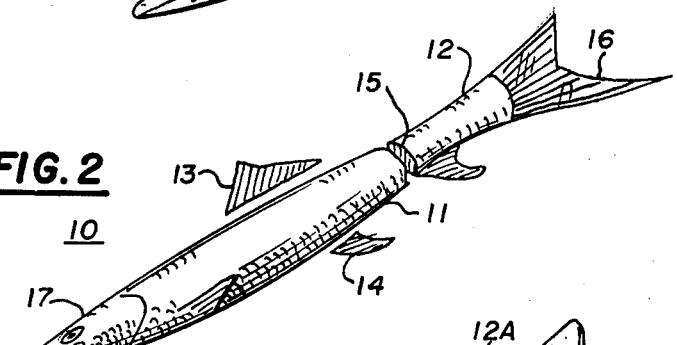
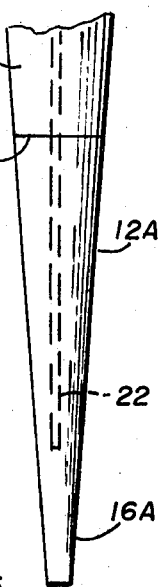
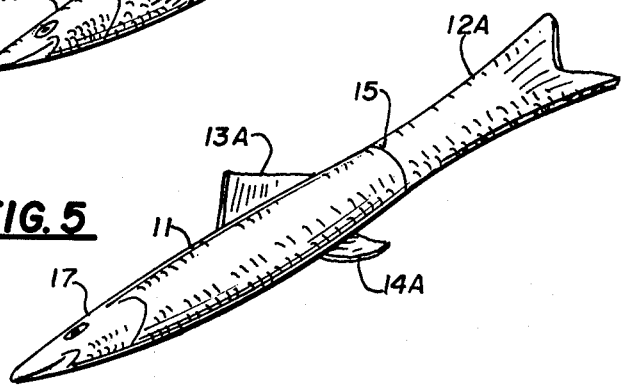
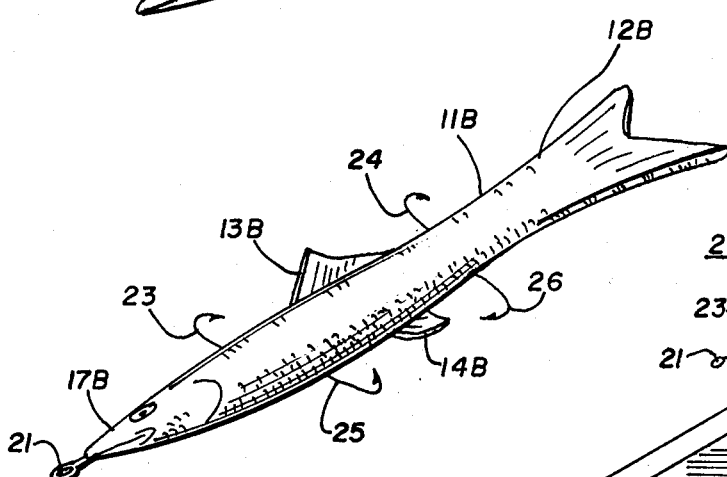
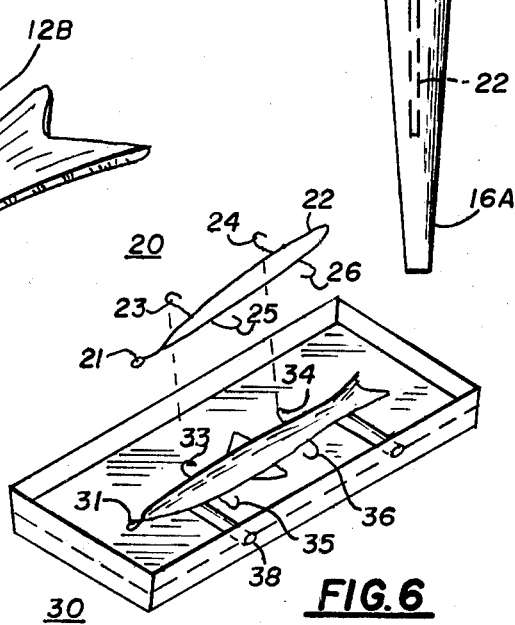

REENFORCED FISHING LURE

BACKGROUND OF THE INVENTION

There are very many types of fishing lures or plugs that can be formed into molds in which hooks and other devices can be positioned for the molding of useful lures. Usually the initial plug must be carved or otherwise hand-crafted, and a separate plug must be made of each and every kind and size of bait fish that is to be formed into a mold. These may be a reasonable facsimile of the natural fish, but more often they are not even a good copy.

A new method of making a mold, quickly and simply, that is an exact copy of any kind and size of bait fish that is desired to be duplicated is taught in my U.S. Pat. No. 4,108,955 for a "METHOD FOR MAKING A FISHING LURE."

In this method, a bait fish of any desired size and type is partially embedded in a freshly poured bed of mold material to form the lower part or portion of a mold. Suitable hooks and other connecting hardware or equipment may be embedded in this portion of the mold along with the bait fish to facilitate the inclusion of corresponding inserts in the molding process. Also, devices for forming suitable ducts or channels for pouring in the molding material as well as for providing for the escape of air may be included at this point. Additional mold material is then poured on top of the lower portion of the mold to cover the bait fish and any other equipment to form the upper part or portion of the mold.

Suitable mold release agents may be provided about the bait fish, and between the two parts of the mold, as necessary. When the mold material has hardened, the upper part may be lifted, and the bait fish and any hooks and other connecting hardware may be lifted out, along with the bait fish, to evacuate the mold. Similar hooks and interconnecting hardware may then be put into the mold, which is closed and filled with the desired molding material, to produce a fishing lure.

The above-summarized, patented invention provides a new dimension in accuracy for a lure, but has certain, practical limitations. For example the tail of an actual fish tapers to a paper-thin section that serves its function in swimming, but is expendable when the fish is eaten in its normal life cycle. A lure, on the other hand, of plastic or any available material would have even less strength than the natural fish, and the tail section could be broken off in use, or even in a bait box. Similarly, the dorsal fin—and the other fins—are equally thin, and may not even project in a natural manner when the fish is out of water. The exactly duplicated fins would be equally fragile on a lure, in or out of the water.

It is therefore an object of this invention to provide a bait-fish lure that is a substantially—exact replica of the original, yet has a thickened and reenforced tail portion, and a thickened and strengthened dorsal fin with a profile similar to that of the fish in the water.

It is a further object of this invention to provide a bait fish lure that is a substantially—exact replica of the original, yet has a means for securing the necessary hooks, etc.

It is a further object of this invention to provide a bait fish lure that is a substantially—exact replica of the original, yet has fin-like projections to function as diving planes.

SUMMARY OF THE INVENTION

A method for making improved fish lures from exact copies of a natural bait fish of any desired size and shape wherein an exact, molded copy of the bait fish is made without hooks or other appurtenances. The tail portion of the molded copy is then cut off far enough into the body of the fish to provide a relatively-strong cross section thickened, reenforceable substitute copy of the tail is attached in its place.

The dorsal fin section—if any—of the molded copy of the bait fish may also be cut off and a substitute copy of thicker material may be added. Other fins sections—if any—may also be removed and thicker and stronger substitute fins may be added for any desired purpose.

BRIEF DESCRIPTION OF THE DRAWINGS

FIG. 1 shows an isometric view of an exact copy of a bait fish;

FIG. 2 shows an isometric view of the exact copy of the bait fish with the tail portion and other fins cut off;

FIG. 3 shows a top view of the original tail portion;

FIG. 4 shows a substitute tail portion;

FIG. 5 shows a modified copy with the substitute sections or portions attached to the original body;

FIG. 6 shows a new mold made with the modified copy; and

FIG. 7 shows the final molded bait fish copy of the modified lure with hooks, etc.

DETAILED DESCRIPTION OF THE PREFERRED EMBODIMENT

Referring now more particularly to FIG. 1, an isometric view of an exact copy of a bait fish 10, without hooks etc. is shown. This may be made in accordance with the teachings of my afore-mentioned patent. The body 11 has a tail portion 12 tapering into its extremity 16; fins 13 and 14; and a head 17.

FIG. 2 shows another isometric view of the same copy of the bait fish with similar elements similarly numbered. Here the tail portion 12 is cut off the body portion at 15, and the dorsal fin 13 as well as the pectoral fin 14 are shown cut away from the body portion 11. The extremities of the tail portion 16 and the fins would be extremely thin and fragile in exact copies.

FIG. 3 shows a top view that illustrates this. The body 11 of the exact copy is cut in the tail portion 12 at an area of substantial thickness 15. The original tail tapers to an extremely thin section 16 that could be too delicate to handle for all practical purposes.

FIG. 4 shows a top view of a substitute tail portion 12A which may be attached to the original body portion 11 at 15. This shows a smooth blending through the substantially thicker section of the body at 15 to the extremity 16A. This substitute tail portion is thick enough to contain reenforcing wiring 22, that will be illustrated more clearly in FIG. 6.

FIG. 5 shows an isometric view of the modified lure with the substitute tail portion 12A attached to the original body portion 11 at 15, and a substitute dorsal fin 13A and a substitute pectoral fin 14A attached to the original body portion 11 at suitable places.

FIG. 6 shows a new mold 20 made in the manner described in the afore-mentioned patent. The new mold also includes indentations such as 31 through 36 for the leaders and hooks. Holes or ports 38 must, again, be provided for filling the mold with a suitable liquid plastic. A hook and eye assembly 20 is provided with an eye 21 and hook 23 to 26 attached to a wire 22 that may extend back into the tail portion for reenforcement. This may be positioned within the mold cavity within the suitable indentations, such as 31 to 36, before the molding material is poured to form the improved lure.

FIG. 7 shows a final molded copy of the modified bait fish, as a complete lure with body portion 11B, tail portion 12B etc, and hooks 23 through 26 projecting from the body portion. The fishing line may be attached to the lure at the eye 21.

In practice an original, exact, copy of a given bait fish will have an extremely thin tail section, and may or may not have dorsal or other fins projecting at all, since a fish out of water has no need of them.

The tail portion which is essential to the profile and the stability of the fish may be strengthened by cutting off the original, exact copy of the tail portion 12 far enough up on the body of the copy of the given bait fish to provide enough thickness for the formation of a substitute, strengthened tail portion 12A. The substitute tail portion can be made to taper smoothly from the body portion, but can have thick enough extremities to withstand reasonable handling and abuse.

The fins, as noted earlier, may or may not appear on the exact copy of the bait fish, as molded according to my original method, but may be necessary, or desireable to simulate the original bait fish, or to control its motion in the water. The dorsal fins, for example, may add stability in a lure, and the pectoral or pelvic fins may be useful as diving planes or in controlling the level or motion of the lure.

Replacement fins may be formed accordingly, and added as necessary or desireable for the stability or control of the lure. The original profile and positions of the fins may be retained, but they must, obviously, be thickened in all areas to be securely attached to the improved copy of the bait fish and to survive normal handling and use.

The final improved and strengthened version of the bait fish, as seen in FIG. 5, can now be molded in almost the exact same manner as the original bait fish. A reenforcing network may again be formed to fit into the new mold in the same manner to supply connecting eyes as well as hooks and other appurtenances.

While a typical layout of hooks etc. is shown, it is obvious that more or less hooks and combinations of hooks may be added to accomodate the function the bait fish and the potential catch.

I claim:

1. A method for making a fishing lure from an exact copy of a given bait fish comprising the steps:

cutting off the tail portion of said exact copy of said given bait fish at a relatively thick portion of the body of the fish;

forming a substitute tail portion of the same profile as that of the original portion of said given fish, but tapering to a much thicker section having the same profile as that of the original tail portion of said given bait fish;

attaching said substitute tail portion to the body of said exact copy of said given bait fish, to provide a modified copy of said bait fish;

making a final mold of said modified copy of said original bait fish;

embedding a reenforcing network including connecting eyes, hooks, and other necessary appurtenances into said mold; and molding a fishing lure in said final mold.

2. A method for making a fishing lure from an exact copy of a bait fish as in claim 1 wherein said dorsal and pectoral fins of said exact duplicate of said given bait fish are cut off, and a substitute dorsal and pectoral fin portions are formed of the same profile as that of the original portions of said given bait fish, but tapering to a much thicker section having the same profile as that of the original dorsal and pectoral fins.

* * * * *